United States Patent
Alshehri et al.

(10) Patent No.: US 12,402,995 B1
(45) Date of Patent: Sep. 2, 2025

(54) DENTAL APPARATUS, DENTAL ASSEMBLY INCLUDING THE DENTAL APPARATUS AND METHOD OF USING THE DENTAL ASSEMBLY

(71) Applicant: KING SAUD UNIVERSITY, Riyadh (SA)

(72) Inventors: Mohammed Abdullah Alshehri, Riyadh (SA); Ibraheem Rshood Alqwizany, Riyadh (SA); Omar Mohammed Alshehri, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/237,387

(22) Filed: Jun. 13, 2025

Related U.S. Application Data (62) Division of application No. 19/090,815, filed on Mar. 26, 2025.

(51) Int. Cl.
*A61C 19/04* (2006.01)

(52) U.S. Cl.
CPC ................... *A61C 19/041* (2013.01)

(58) Field of Classification Search
CPC .. A61C 1/082; A61C 5/40; A61C 5/42; A61C 5/44; A61C 5/80; A61C 5/82; A61C 5/85; A61C 19/04; A61C 19/041; A61C 19/042
See application file for complete search history.

(56) References Cited

U.S. PATENT DOCUMENTS

| | | | |
|---|---|---|---|
| 1,943,668 A | 1/1934 | Hartman | |
| 4,177,565 A | 12/1979 | Heasley | |
| 4,303,391 A | 12/1981 | Weissman | |
| 4,639,221 A | 1/1987 | Sairenji | |
| 6,390,814 B1 * | 5/2002 | Gardiner | A61C 1/082 433/102 |
| 7,347,830 B2 * | 3/2008 | Becker | A61C 19/041 600/587 |
| 8,869,410 B1 | 10/2014 | Callahan | |
| 9,962,234 B2 * | 5/2018 | Chodorow | A61B 6/0492 |

FOREIGN PATENT DOCUMENTS

| | | | | |
|---|---|---|---|---|
| WO | WO-2024112871 A1 * | 5/2024 | | A61C 5/82 |

* cited by examiner

*Primary Examiner* — Edward Moran
(74) *Attorney, Agent, or Firm* — Nath, Goldberg & Meyer; Joshua B. Goldberg (57) ABSTRACT

A dental apparatus usable for root canal procedures in conjunction with a dental clamp includes a first base member, a second base member spaced apart from the first base member, a first reference member extending between the first and second base members and connecting the first and second base members to one another, the first reference member extending in a first direction relative to an imaginary plane extending across the first and second base members, a second reference member extending between the first and second base members and connecting the first and second base members to one another, the second reference member being spaced apart from the first reference member, a first post extending from the first base member in a second direction relative to the imaginary plane, opposite to the first direction, and a second post extending from the second base member in the second direction.

11 Claims, 5 Drawing Sheets

DENTAL APPARATUS, DENTAL ASSEMBLY INCLUDING THE DENTAL APPARATUS AND METHOD OF USING THE DENTAL ASSEMBLY

CROSS-REFERENCE TO RELATED APPLICATION

This application is a divisional of U.S. patent application Ser. No. 19/090,815, filed on Mar. 26, 2025, the entire contents of which are incorporated herein by reference.

TECHNICAL FIELD

The present disclosure relates to a dental apparatus, and more particularly, to a dental assembly including the dental apparatus and a dental clamp, and a method of using the same during a root canal procedure.

DISCUSSION OF THE RELATED ART

Endodontics is afield of dentistry that focuses on the roots of teeth. A root canal procedure involves removing the pulp (or nerve) material from each root canal of a tooth.

It is important to measure the length of a root canal precisely to avoid drilling the root canal too close to the apex or past the apex of the involved tooth.

A reference point typically used by dentists (or endodontists) to measure the length of a root canal is a cusp of the tooth being worked on. However, the reliance on a cusp complicates the measurement process because cusps are usually domed. Therefore, a measurement taken by using a cusp as a reference point varies depending on the field of view of the dentist (i.e., on the visual alignment between the dentist's eye, the cusp and the measurement tool inserted in the root canal, behind the cusp).

Worse, in some cases a tooth may be damaged to the point of not having a cusp available for use as a reference point. Accordingly, the use of measurements based on the cusp of the tooth may be unreliable.

SUMMARY

The present disclosure relates to a dental apparatus that can be used to provide a convenient reference point for measuring a root canal length. After being used to provide a conveniently located reference point under (or over) the occlusal surface of a tooth, the apparatus of the present subject matter can be used by a dentist as a reference point and/or as a stopping structure for stopping further penetration of a dental file into a root canal when the maximum desirable length of the file has been inserted inside of the root canal.

The dental apparatus of the present subject matter has a bridge-like structure where a pair of bridge-like members are configured to rise up from the gum line (or slightly above the gum line) and extend over and across the crown of a tooth when the dental apparatus is oriented to be used on teeth located on the lower jaw of a patient. The bridge-like members are separated from one another, and each bridge like member can be used as a structure providing a reference point for measuring a root canal length and as a reference point for indicating when the maximum length of file has been inserted into a root canal.

The dental apparatus also includes a pair of legs, or posts. The legs can be selectively connected to a dental clamp used for holding a rubber dam under the tooth (on the exterior of the tooth being worked on). That is, a dental clamp, which is conventionally used for holding the rubber dam secured under the crown of the tooth being worked on, is conveniently used as a structure for holding the dental apparatus of the present subject matter in place.

The legs of the dental apparatus can be shaped and sized to be inserted, individually, in the pair of through holes of the dental clamp. That is, the same pair of holes of a conventional dental clamp that are used for manipulating a dental clamp to clamp the dental clamp to a tooth at the beginning of the root canal procedure can then be used for selectively connecting the apparatus of the present disclosure to the dental clamp.

A dental professional can then insert a dental file in a root canal, and use the location where the dental file intersects with the either one of the bridge-like members as a reference point for determining the length of the root canal and/or as a reference point for determining the maximum depth of penetration of the dental file such that the dental file does not extend too close to the apex in the root canal (and such that the dental file does not penetrate past the apex).

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where products are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Referring to FIGS. 1-4, a dental apparatus includes a first base member 100, a second base member 200 spaced apart from the first base member 100, a first reference member 300 extending between the first and second base members 100, 200 and directly connecting the first and second base members 100, 200 to one another, a second reference member 500 extending between the first and second base members 100, 200 and directly connecting the first and second base members to one another, a first post 700 and a second post 900.

The dental apparatus of FIGS. 1-4 can be made of an elastomeric material (e.g., plastic), a metal (e.g., stainless steel), or a combination of elastomeric and metallic components.

Referring to FIGS. 1-4, the first reference member 300 may extend (or protrude) in a first direction D1 relative to an imaginary plane P. The imaginary plane P extends across the first and second base members 100, 200.

The second reference member 500 may extend in the first direction D1 relative to the imaginary plane P. The second reference member 500 may be spaced apart from the first reference member 300.

The first post 700 may extend from the first base member 100 in a second direction D2 relative to the imaginary plane P. The second direction D2 may be opposite to the first direction D1.

The second post 900 may extend from the second base member 200 in the second direction D2.

As illustrated in FIGS. 1-4, the first reference member 300 may include a third post 310 extending from the first base member 100 in the first direction D1, a fourth post 330 extending from the second base member 200 in the first direction D1, and a first beam 350 connecting the third and fourth posts 310, 330 to one another. The first beam 350 may be spaced apart from the first and second base members 100, 200 in the first direction D1, for example, by a length of the third and fourth posts 310, 330.

As illustrated in FIGS. 1-4, at least one selected from the group consisting of the third post 310, the fourth post 330 and the first beam 350 may be straight. For example, each one of the third post 310, the fourth post 330 and the first beam 350 can be straight. In addition, and as illustrated in FIGS. 1-4, the third and fourth posts 310, 310 may be parallel to one another, and the first beam 350 may extend perpendicularly to the third and fourth posts 310 330.

However, the present subject matter is not limited to this configuration. The third and fourth posts 310, 330 may also extend non-perpendicularly (e.g., with a non-zero angle) relative to one another in the first direction D1. In addition, the first beam 350 can extend at an acute angle or at an obtuse angle relative to the third and fourth posts 310, 330. Moreover, the third and fourth posts 310, 330 need not be straight, but should have equal lengths such that the first beam 350 can be aligned substantially parallel to the imaginary plane P.

The second reference member 500 may include a fifth post 510 extending from the first base member 100 in the first direction D1, a sixth post 530 extending from the second base member 200 in the first direction D1, and a second beam 550 connecting the fifth and sixth posts 510, 530 to one another. The second beam 550 may be spaced from the first and second base members 100, 200 in the first direction D1, for example, by a length of the fifth and sixth posts 510, 530.

As illustrated in FIGS. 1-4, at least one selected from the group consisting of the fifth post 510, the sixth post 530 and the second beam 350 may be straight. For example, each one of the fifth post 510, the sixth post 530 and the second beam 550 can be straight. In addition, and as illustrated in FIGS. 1-4, the fifth and sixths posts 510, 530 may be parallel to one another, and the second beam 550 may extend perpendicularly to the fifth and sixth posts 510, 530.

However, the present subject matter is not limited to this configuration. The fifth and sixth posts 510, 530 may also extend non-perpendicularly (e.g., with a non-zero angle) relative to one another in the first direction D1. In addition, the second beam 550 can extend at an acute angle or at an obtuse angle relative to the fifth and sixth posts 510, 530. Moreover, the fifth and sixth posts 510, 530 need not be straight, but should have equal lengths such that the second beam 550 can be aligned substantially parallel to the imaginary plane P.

As illustrated in FIGS. 1-4, the third and fifth posts 310, 510 can extend in parallel to one another, the fourth and sixth posts 330, 530 can extend in parallel to one another, the first and second beams 350, 550 can extend in parallel to one another and the first and second posts 700, 900 can extend in parallel to one another. In addition, the first and second beams 350, 550 may extend (or be disposed) at the same height as one another relative to the imaginary plane P.

The first post 700 may include a first protrusion 710 at an end thereof that is distal to the first base member 100. The first protrusion 710 may be wider than the first post 700. For example, with reference to FIG. 3, a width W2 of the first protrusion 710 is greater than a width W1 of the first post 700.

Figure 1:
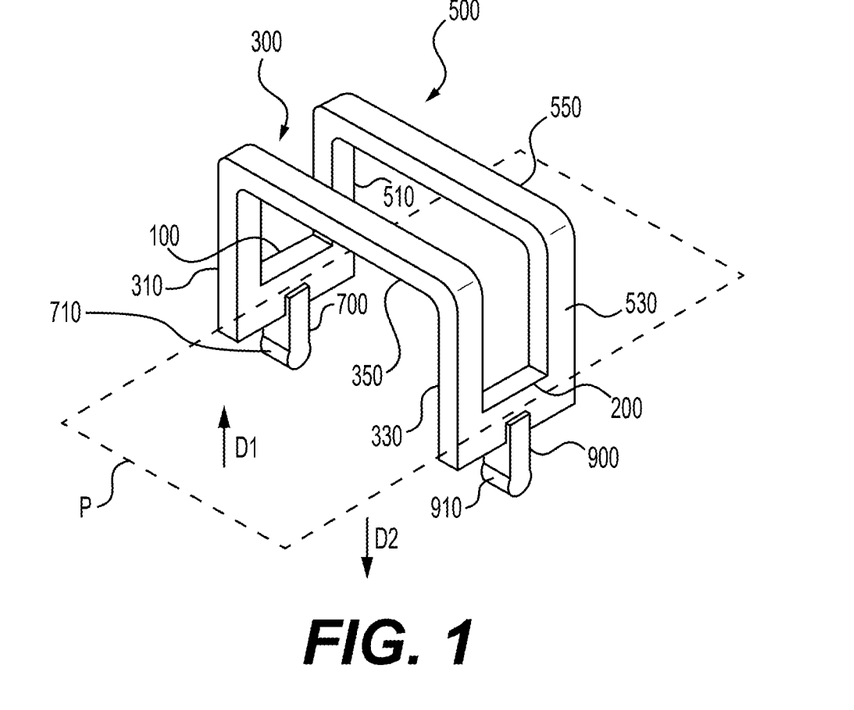
FIG. 1 is a perspective view illustrating a dental apparatus according to an exemplary embodiment of the present disclosure.
Figure 2:
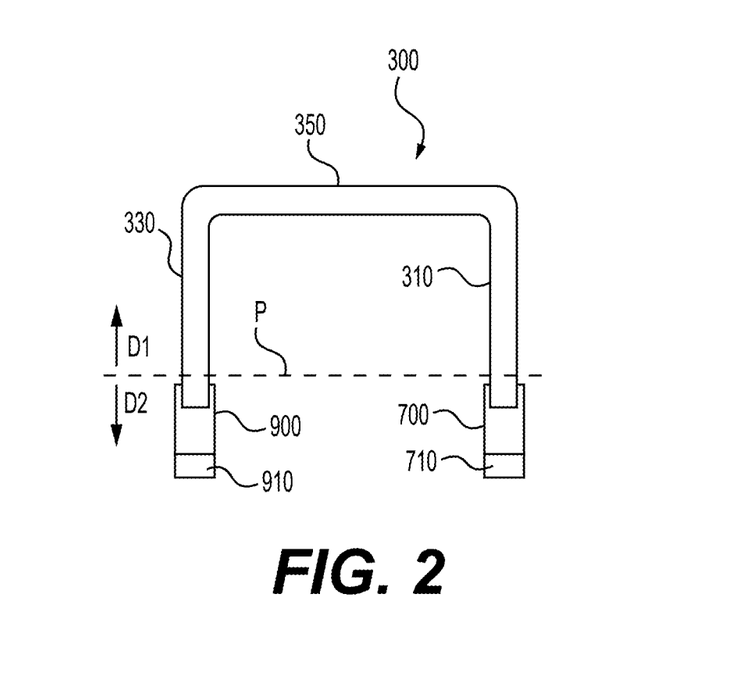
FIG. 2 is a front view illustrating the dental apparatus of FIG. 1.
Figure 3:
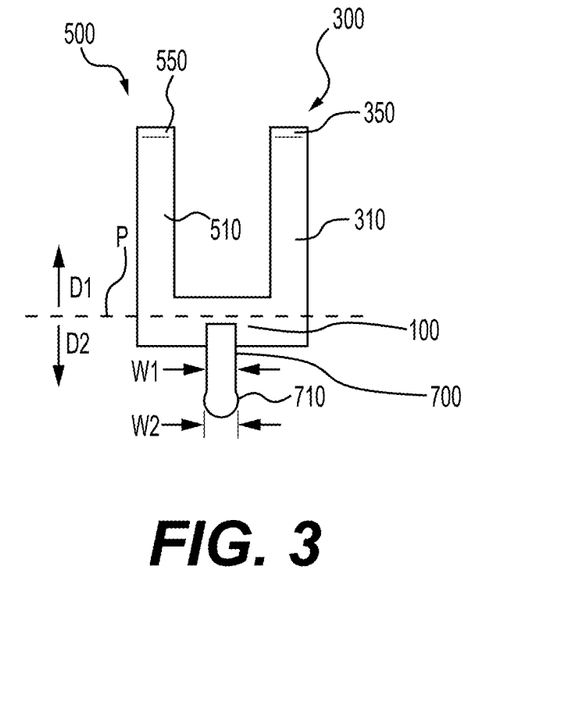
FIG. 3 is a side view illustrating the dental apparatus of FIG. 1.
Figure 4:
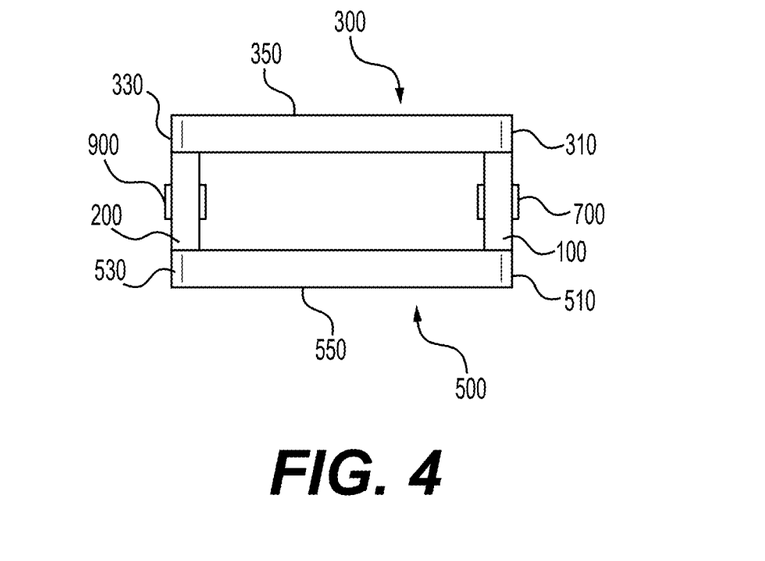
FIG. 4 is a top view illustrating the dental apparatus of FIG. 1.

The second post 900 may include a second protrusion 910 at an end thereof that is distal to the second base member 200. The second protrusion 910 may be wider than the second post 900.

Figure 5:
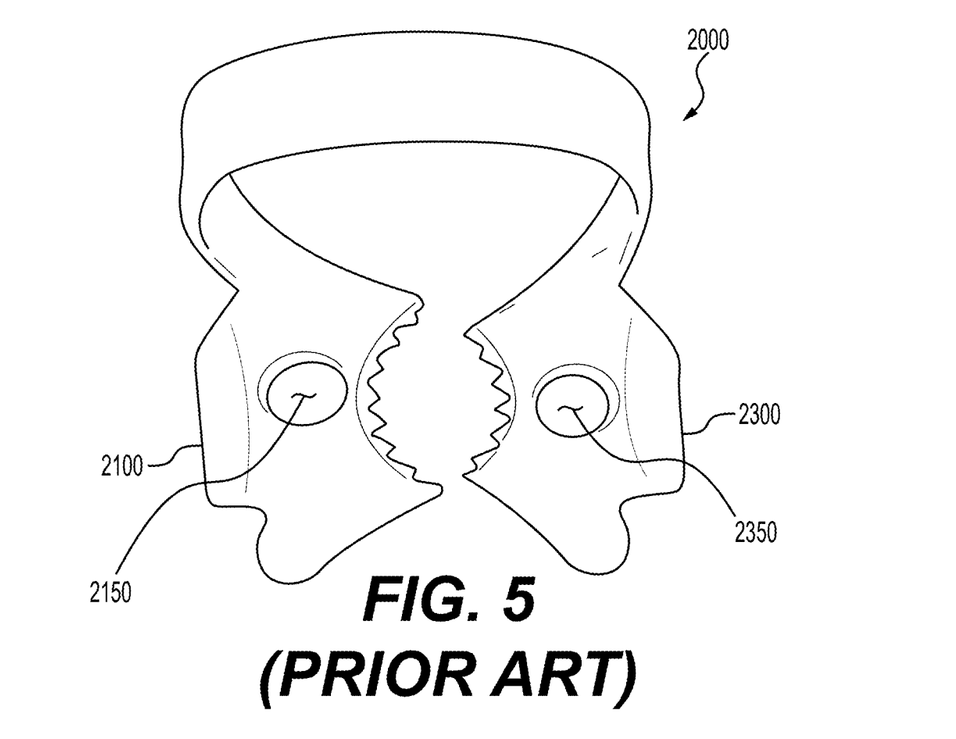
FIG. 5 is a perspective view illustrating a dental clamp.

FIG. 5 illustrates an example of a metallic dental clamp 2000 known in the art. The dental clamp 2000 illustrated in FIG. 5 and other similar dental clamps are conventionally used to hold a rubber dam (or rubber sheet) in place at an exterior surface of a tooth being worked on (around the gumline) by an endodontist during a root canal procedure.

As illustrated in FIG. 5, the dental clamp 2000 includes a first clamping portion 2100 and a second clamping portion 2300. The first and second clamping portions 2100, 2300 are configured to (or can be used to) releasably clamp the dental clamp 2000 to a tooth (see FIG. 9). The first clamping portion 2100 has a first through hole 2150 and the second clamping portion 2300 has a second through hole 2350.

Figure 6:
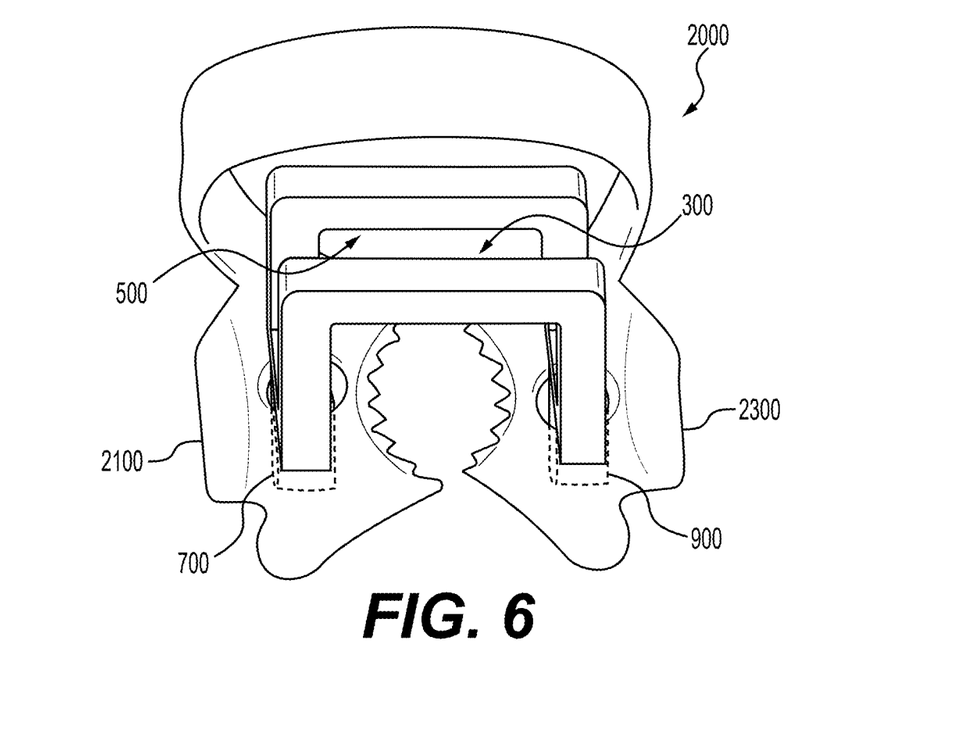
FIG. 6 is a perspective view illustrating an assembly that includes the dental apparatus of FIG. 1 selectively connected to the dental clamp of FIG. 5.
Figure 7:
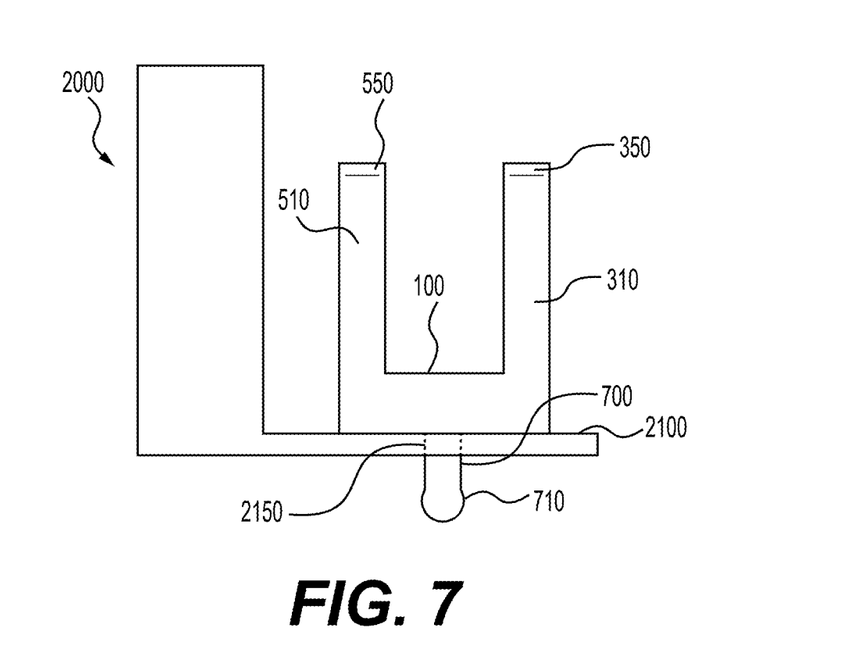
FIG. 7 is a side view illustrating the assembly of FIG. 6.
Figure 8:
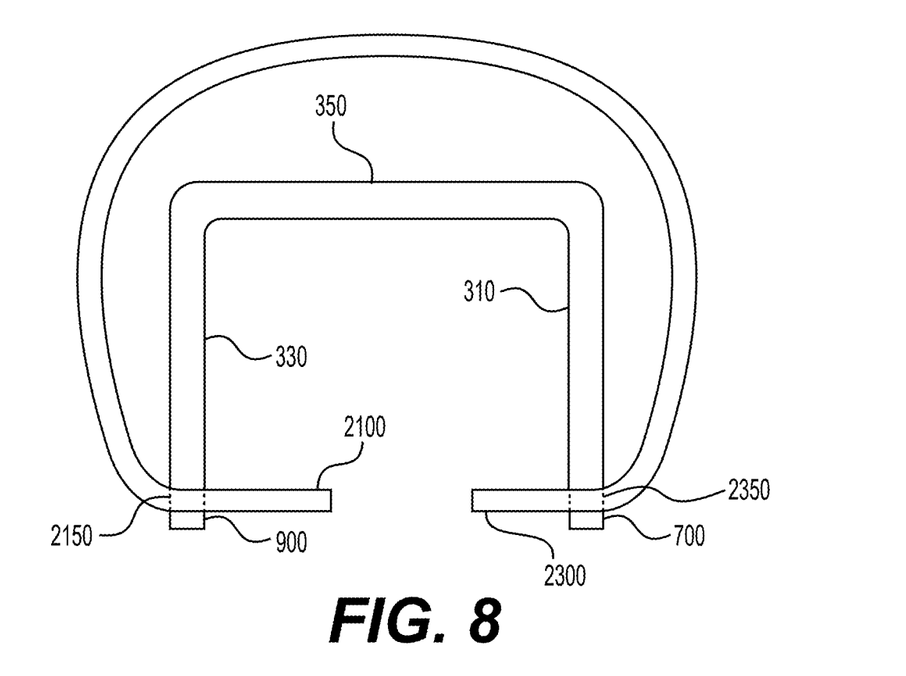
FIG. 8 is a front view illustrating the assembly of FIG. 6.

As illustrated in FIG. 6-8, the apparatus of FIGS. 1-4 and the dental clamp 2000 of FIG. 5 can be combined with one another to form a dental assembly.

A method of using a dental assembly in accordance with the present subject matter includes obtaining a dental clamp. For example, the method includes obtaining the dental clamp 2000.

The method includes selectively connecting the obtained dental clamp to a tooth of a patient. For example, the dental clamp may be connected to a tooth of a patient that will receive a root canal treatment. The dental clamp 2000 is generally connected to the tooth to be worked on by positioning the first and second clamping portions 2100, 2300 at about the gumline of the tooth to be worked on.

The method may also include placing a rubber dam around the crown of the tooth to be worked on, under the first and second clamping portions 2100, 2300.

The method includes obtaining a dental apparatus as illustrated in FIGS. 1-4.

The method includes selectively connecting the dental apparatus to the dental clamp 2000 by inserting the first post 700 in the first through hole 2150 and the second post 900 in the second through hole 2350. Alternatively, the dental apparatus may be connected to the dental clamp 2000 by inserting the second post 900 in the first through hole 2150 and inserting the first post 700 in the second through hole 2350.

The first and second posts 700, 900 may be sized and shaped to frictionally engage with the first and second through holes 2150, 2350 in a way that creates forces of a magnitude that is sufficient to selectively yet firmly connect the apparatus of FIGS. 1-4 to the dental clamp 2000.

Alternatively, or in addition, the first and second protrusions 710, 910 may be sized and shaped to frictionally engage with the first and second through holes 2150, 2350 in a way that creates forces of a magnitude that is sufficient to selectively yet firmly connect the apparatus of FIGS. 1-4 to the dental clamp 2000.

In addition, the first and second protrusions 710, 910 can be used to provide tactile feedback to a dental professional when inserting the first and second posts 700, 900 in the first and second through holes 2150, 2350. The tactile feedback (during the insertion process) can be interpreted by the dental professional to indicate that the first and second protrusions 710, 910 have traveled through the first and second through holes 2150, 2350, therefore, that the dental apparatus of FIGS. 1-4 is selectively and securely connected to the clamp 2000 by frictionally engaging the first and second posts 700, 900 with the first and second through holes 2150, 2350.

The assembly of the present subject matter may appear as shown in FIGS. 6-8 after connecting the dental apparatus of FIGS. 1-4 to the clamp 2000.

The method may include inserting a dental file inside of a root canal of a tooth to remove the pulp (or nerve material) from the root canal. See the dental file 3000 in FIG. 9.

As illustrated in FIGS. 1, 3-4, 6 and 7, the first and second beams 350, 550 can be spaced apart from one another. The separation distance between the first and second beams 350, 550 can be, for example, constant along the lengths of the first and second beams 350, 550.

The separation distance between the first and second beams 350, 550 is intended to provide the working space for a dental professional to insert a dental file into a root canal for performing a root canal procedure.

Figure 9:
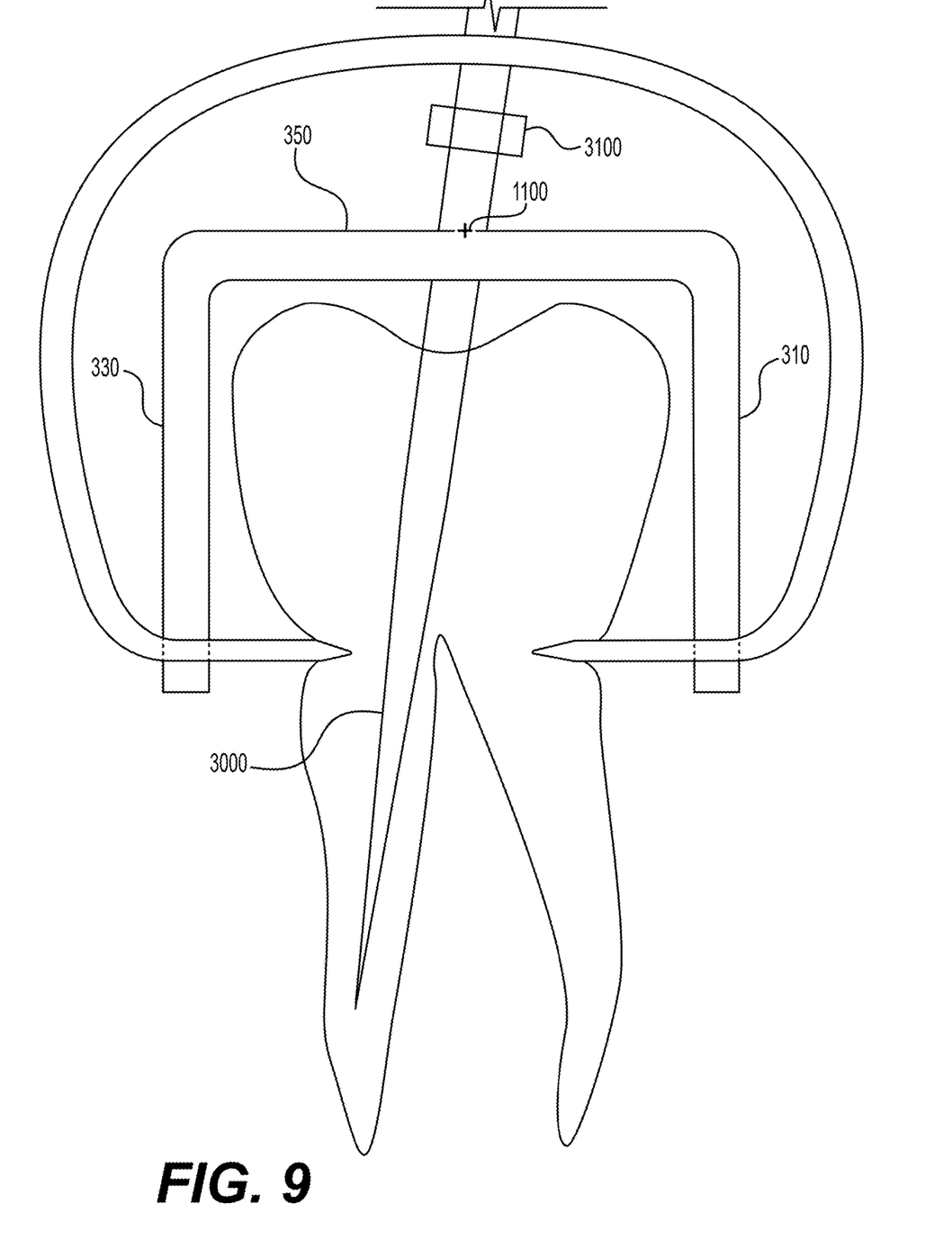
FIG. 9 is a composite front view illustrating the assembly of FIG. 6 being connected to a tooth and a dental file inserted in the tooth.

That is, and with reference to FIG. 9, the process of inserting a dental file 3000 inside of a root canal includes passing (or inserting) the dental file 3000 between the first and second beams 350, 550 first, and then continuing to pass (or insert) the dental file 3000 such that the dental file 3000 enters the crown of the tooth, and then enters a root canal of the tooth being worked on. This step may be repeated for each one of the plurality of root canals that the tooth being worked on may have. This way, the pulp may be removed from all of the root canals of the tooth being worked on.

Subsequent to the insertion step, or simultaneously with the insertion step (i.e., as the file is being inserted in a root canal of a tooth), the method includes using the intersection between the dental file 3000 and the first beam 350 (or the intersection between the dental file 3000 and the second beam 550) as a reference point for determining a length of the root canal or as a reference point for determining a maximum depth of insertion of the file in the root canal.

An intersection 1100 between the first beam 350 and the file 3000 is exemplarily illustrated in FIG. 9 as being the reference point used for determining the length of the root canal or as the point being used for determining a maximum depth of insertion of the file 3000 in the root canal.

For example, a mark can be made on a file to determine the length of a root canal. Alternatively, or in addition, a mark made on a file can be used as a reference point to indicate to an endodontist the maximum depth that the file 3000 can be inserted in a root canal. That is, the file 3000 can be inserted inside of a root canal until the mark on its body reaches, for example, the top surface of the first beam 350, as illustrated in FIG. 9.

Alternatively, or in addition, a slidable rubber stopper 3100 (typically provided with conventional dental files) can be selectively slid (and stay where moved by frictional forces) to a location along the body of a file. For example, the rubber stopper 3100 can be slid to a point along the body of a file that marks the maximum depth of insertion of the file 3000 into a root canal. In this case, the file 3000 can be inserted into a root canal of a tooth until the rubber stopper 3100 comes in contact with the top of the first beam 350 or reaches the same height as that of the top of the first beam 350 without contacting the first beam 350, depending on the alignment of the file 3000 when inserted in a particular root canal of the tooth. This scenario applies when the root canal being worked on is located closer to the first beam 350 than to the second beam 550 (in an occlusal view, or top plan view).

On the other hand, when a root canal is closer to the second beam 550 in an occlusal or top plan view, the file 3000 can be inserted in the root canal until the rubber stopper 3100 comes in contact with the top of the second beam 550 or reaches the same height as that of the top surface of the second beam 550 but without contacting the second beam 550, depending on the alignment of the file 3000 when inserted in the root canal.

Stated otherwise, the length of a root canal can be determined and/or the maximum depth of the penetration of a file in a root canal can be checked/monitored by making a mark (or establishing some other visual indicia) on the body of a dental file, and inserting the dental file in a root canal until the mark or visual indicia made thereon intersects with or contacts the top of whichever beam is closer to the file from among the first and second beams 350, 550.

Since the apparatus of FIGS. 1-4 is securely connected to the clamp 2000 and since the clamp 2000 is securely connected to the tooth being worked on, the first and second beams 350, 550 are stably connected to the tooth being worked on. As such, the first and second beams 350, 550 can be used repetitively and reliably as reference structures for quickly and accurately determining a length of a root canal or for determining a maximum depth of insertion of a dental file in a root canal.

The configuration of the dental apparatus and dental assembly of the present subject matter is advantageous during a root canal procedure because a dentist (or endodontist) generally inserts several different files several different times each inside of each root canal of a tooth for extracting the pulp and cleaning the root canals.

After the measurement of a particular root canal, the maximum length of insertion of a particular dental file in a particular root canal must be established (by making a mark and/or using a rubber stopper, as described in this specification). Using the first and/or second beams 350, 550 of the apparatus of the present subject matter as reference structures to ensure that a file is inserted in a root canal up to but no more than its marked maximum insertion length significantly increases the accuracy of work (i.e., that the dentist will not insert the file beyond the marked length or less than the marked length) simply by comparing the insertion length against the top of the first and/or second beams 350, 550.

Since the first and second beams 350, 550 may be flat (or straight) and located over (or under) the occlusal surface of the tooth being worked on (depending on whether the tooth being worked on is located on the top jaw or bottom jaw), a dental professional can perform the visual check needed to determine when to stop further inserting a dental file in a root canal quickly and accurately.

The quick and accurate determination of when to stop further inserting a dental file in a root canal, when repeated several times for each one of the several files that must typically be inserted in each root canal of a tooth being worked on, can produce significant time savings during a dental procedure as compared to the manual verification done in the prior art (where a dentist typically checks the insertion depth of a file by comparing a mark made on a file with the cusp of a tooth, which is difficult to perform due to the domed shape of a cusp and can lead to reading errors).

In addition to the time savings, the dental apparatus, dental assembly and method of the present subject matter can significantly reduce the stress and fatigue that an endodontist typically undergoes during a root canal procedure by simplifying the process of determining when each file has been inserted to the correct depth in each root canal for each file used (and doing so reliably).

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A method of using a dental assembly, comprising:
obtaining a dental clamp, said dental clamp including a first clamping portion and a second clamping portion, the first and second clamping portions being configured to releasably clamp the dental clamp to a tooth, wherein the first clamping portion has a first through hole and the second clamping portion has a second through hole;
selectively connecting the dental clamp to a tooth of a patient;
obtaining a dental apparatus, said dental apparatus including:
a first base member;
a second base member spaced apart from the first base member;
a first reference member extending between the first and second base members and directly connecting the first and second base members to one another, the first reference member extending in a first direction relative to an imaginary plane that extends across the first and second base members;
a second reference member extending between the first and second base members and directly connecting the first and second base members to one another, the second reference member extending in the first direction relative to the imaginary plane, the second reference member being spaced apart from the first reference member;
a first post extending from the first base member in a second direction relative to the imaginary plane, opposite to the first direction; and
a second post extending from the second base member in the second direction relative to the imaginary plane,
wherein the first post is configured to be inserted in the first through hole of the first clamping portion to selectively connect the dental clamp and the dental apparatus to one another, and
wherein the second post is configured to be inserted in the second through hole of the second clamping portion to selectively connect the dental clamp and the dental apparatus to one another;

selectively connecting the dental apparatus to the dental clamp to one another by inserting the first post in the first through hole and the second post in the second through hole;

inserting a dental file inside of a root canal of the tooth, the inserting of the dental file inside of the root canal causes the dental file to intersect with a first beam of the first reference member; and using the intersection between the dental file and the first beam as a reference point for determining a length of the root canal or as a reference point for determining a maximum depth of insertion of the file in the root canal.

2. The method of claim 1, wherein the first reference member includes a third post extending from the first base member in the first direction, a fourth post extending from the second base member in the first direction, and the first beam connecting the third and fourth posts to one another, the first beam being spaced from the first and second base members in the first direction.

3. The method of claim 2, wherein at least one selected from the group consisting of the third post, the fourth post and the first beam is straight.

4. The method of claim 2, wherein the first beam is straight.

5. The method of claim 2, wherein the second reference member includes a fifth post extending from the first base member in the first direction, a sixth post extending from the second base member in the first direction, and a second beam connecting the fifth and sixth posts to one another, the second beam being spaced from the first and second base members in the first direction.

6. The method of claim 5, wherein at least one selected from the group consisting of the fifth post, the sixth post and the second beam is straight.

7. The method of claim 5, wherein the second beam is straight.

8. The method of claim 5, wherein the first and second beams extend in parallel to one another.

9. The method of claim 5, wherein the first and second beams are disposed at a same height relative to the imaginary plane.

10. The method of claim 1, wherein the first post includes a first protrusion at an end thereof that is distal to the first base member, the first protrusion being wider than the first post.

11. The method of claim 10, wherein the second post includes a second protrusion at an end thereof that is distal to the second base member, the second protrusion being wider than the second post.

* * * * *